United States Patent
Viswanath et al.

(10) Patent No.: US 10,262,139 B2
(45) Date of Patent: Apr. 16, 2019

(54) SYSTEM AND METHOD FOR DETECTION AND PREVENTION OF DATA BREACH AND RANSOMWARE ATTACKS

(71) Applicant: INSTITUTE FOR DEVELOPMENT AND RESEARCH IN BANKING TECHNOLOGY, Hyderabad (IN)

(72) Inventors: Hiran Viswanath, Hyderabad (IN); Babu Mahadappa Mehtre, Hyderabad (IN)

(73) Assignee: INSTITUTE FOR DEVELOPMENT AND RESEARCH IN BANXING TECHNOLOGY, Hyderabad (IN)

( * ) Notice: Subject to any disclaimer, the term of this patent is extended or adjusted under 35 U.S.C. 154(b) by 0 days.

(21) Appl. No.: 15/821,902

(22) Filed: Nov. 24, 2017

(65) Prior Publication Data

US 2018/0096150 A1    Apr. 5, 2018

Related U.S. Application Data

(63) Continuation-in-part of application No. 15/093,690, filed on Apr. 7, 2016, now Pat. No. 9,959,406.

(30) Foreign Application Priority Data

Dec. 2, 2015    (IN) .......................... 6477/CHE/2015

(51) Int. Cl.
*G06F 21/55*    (2013.01)
*G06F 21/56*    (2013.01)

(52) U.S. Cl.
CPC .......... *G06F 21/566* (2013.01); *G06F 21/554* (2013.01); *G06F 2221/034* (2013.01)

(58) Field of Classification Search
CPC .............................. G06F 21/554; G06F 21/566
USPC ........................................................... 726/23
See application file for complete search history.

(56) References Cited

U.S. PATENT DOCUMENTS

| | | | | |
|---|---|---|---|---|
| 9,152,789 B2* | 10/2015 | Natarajan | ........... | H04L 63/1416 |
| 2005/0021668 A1* | 1/2005 | Beesley | ............. | H04L 63/1416 |
| | | | | 709/217 |
| 2008/0016564 A1* | 1/2008 | Claudatos | ............. | G06F 21/554 |
| | | | | 726/22 |

* cited by examiner

*Primary Examiner* — Michael S McNally
(74) *Attorney, Agent, or Firm* — Barry Choobin; Patent 360 LLC (57) ABSTRACT

The embodiments herein disclose a system and method for detecting a ransomware and preventing data breach. The method identifies whether a process for file access is initiated and executed by a user or by a malware program. The method uses keystrokes, mouse events along with OCR output extracted from recorded background screen image for checking if user has initiated the process. If a new process or file replication request is initiated automatically without any pattern in Key Strokes, Mouse Strokes and background screen, then the process is identified as a ransomware or data breach.

8 Claims, 3 Drawing Sheets

FIG.3

SYSTEM AND METHOD FOR DETECTION AND PREVENTION OF DATA BREACH AND RANSOMWARE ATTACKS

CROSS-REFERENCE TO RELATED APPLICATION

This application is a continuation-in-part of the application which claims priority from U.S. Non-Provisional patent application Ser. No. 15/093,690, filed on Apr. 7, 2016, with the title "A SYSTEM AND METHOD FOR ZERO-DAY PRIVILEGE ESCALATION MALWARE DETECTION", and also claims the priority of the Indian Provisional Patent Application with serial 6477/CHE/2015, filed on Dec. 2, 2015, with the title "A SYSTEM AND METHOD FOR DETECTING ZERO-DAY PRIVILEGE ESCALATION MALWARE". The contents of abovementioned applications are included entirely as reference herein.

BACKGROUND

Technical Field

The embodiments herein is generally related to software security systems and methods. The embodiments herein is particularly related to a ransomware detection system and method. The embodiments herein more particularly relate to a system and method for detecting ransomware and preventing data breach.

Description of the Related Art

Malicious software or malware includes any program or file that is harmful to a computer. Malware includes computer viruses, worms, Trojan horses, adware, spyware, ransomware and any program that gathers information about a computer or its user or otherwise operates without, permission. File encrypting malware (also known as ransomware, "crypters", or cryptoviral extortion) is a class of malware which restricts a user's access to files on their system by encrypting the files. Typically, ransomwares demand a user money for the decrypted files. Also, recovering files from the ransomware is difficult, while recovering files from file encrypting malware is often difficult and impossible.

File encrypting malware is a problem for business users, as the malware may encrypt files both on the local machine, and on any accessible network drives, causing costly disruptions. Current methods of detecting file encrypting malware are substantially the same as those for detecting other malware, e.g. using known signatures, or heuristic analysis of malware-containing files.

Existing systems discloses a process of creating backup copies of files to prevent data breach. Further, if the system detects a process as suspicious, then the file to be changed is backed up before the process changes the file. However, the system causes each process to be followed by a file backup routine which will consume memory and decrease the performance of the computer.

Hence, there is a need for a system and method for detecting any data breach and ransomware in a computing environment. Further, there is a need for a system and method that prevents storage of copies of user files. Further, there is a need for a system and a method that differentiates, user activity on a file from a ransomware/automated program activity.

The above-mentioned shortcomings, disadvantages and problems are addressed herein, which will be understood by reading and studying the following specification.

OBJECTIVES OF THE EMBODIMENTS HEREIN

The primary object of the embodiments herein is to provide a system and method for detecting a ransomware and preventing data breach.

Another object of the embodiments herein is to provide a system and method to identify whether a file access request is initiated and executed by a user or by a malware program.

Yet another object of the embodiments herein is to provide a system and a method for detecting a data breach by using the keystrokes, the Mouse events (movements and clicks) along with an OCR output extracted from a recorded background screen image.

Another object of the embodiments herein is to provide a system and method to differentiate user activity on a file from a ransomware/automated program initiated activity to prevent data breach.

Yet another object of the embodiments herein is to provide a system and method for detecting malicious user file access request occurring from a computing device.

Yet another object of the embodiments herein is to provide a system and method for determining automated programs by analyzing a plurality of words extracted using OCR from a background screen image.

These and other objects and advantages of the embodiments herein will become readily apparent from the following detailed description taken in conjunction with the accompanying drawings.

SUMMARY

The various embodiments herein disclose a system and method for detecting a ransomware and preventing data breach. The system and method herein identifies whether a file access request is initiated and executed by a user or by an automated program to prevent data breach. The embodiments herein disclose a system and a method for detecting a data breach by using the keystrokes, the Mouse events (movements and clicks) along with an OCR output extracted from a recorded background screen image. Further, the method includes differentiating user activity on a file from a ransomware/automated program initiated activity to prevent data breach. The embodiments herein disclose a method for determining automated programs by analyzing a plurality of words extracted using OCR from a background screen image.

According to an embodiment herein, a computer-implemented method is provided for detecting both ransomware and data breach. The method comprises computer-readable instructions stored on a non-transitory, computer readable medium and executed on a computing device comprising hardware processor and a memory, for detecting ransomware and data breach. The method comprises monitoring a plurality of key strokes and a plurality of mouse events performed on the computing device. The plurality of keystrokes is detected by a key logger and the plurality of mouse events are detected by a mouse event logger. The plurality of mouse events comprises a plurality of mouse movements and a plurality of mouse clicks. A display screen of the computing device is recorded with a screen recorder, on an occurrence of each mouse click. A correlation between the plurality of key strokes and the plurality of mouse movements is determined to extract a first list of words using a first correlation engine. The first list of words are words that are captured using a keyboard. A correlation between the plurality of mouse clicks and the recorded display screen is determined using the correlation engine to extract a second list of words. The first and second correlation engine are configured to check whether the user or automated process have clicked on a file or initiated a process to start. Further, a plurality of processes accessing files for editing/modification is identified by a process analysis module by monitoring low-level system calls initiated by an operating system of the computing device. Each process in the plurality of processes is compared with the first list of words and the second list of words. At least one process is identified as a ransomware using the process analysis module when a word corresponding to the process is absent in the first list of words and the second list of words. The process identified as a ransomware automatically trying to open or access the file is terminated. Further, a process accessing a file for replication is identified by the process analysis module. The process 'name' and corresponding file 'name' is compared with the first list of words and the second list of words. The process is identified as an authentic process using the process analysis module when the process name or the file name is present in at least one of the first list of words and the second list of words. The process is identified as a ransomware or a data breach using the process analysis module when words corresponding to the process name and file name are absent in the first list of words and the second list of words. Thereafter, the process corresponding to the ransomware or the data breach is terminated.

According to an embodiment herein, a computer system for detecting zero-day privilege escalation malware in a computing environment is provided. The system comprises a hardware processor coupled to a memory containing instructions configured for running a privilege escalation module for identifying a malware. The system comprises a key logger configured to detect keystrokes performed by a user. A mouse event logger is configured to detect a plurality of mouse events. The plurality of mouse events comprises a plurality of mouse movements and a plurality of mouse clicks. A screen recorder is configured to record a display screen of the computing device on occurrence of each mouse click. An OCR word extractor is configured to extract only a second list of words from screen shots. A first list of words is extracted from key strokes. A first correlation engine is configured to determine a correlation between the key strokes and the mouse movements to extract a first list of words, wherein the first list of words are typed using keyboard. A second correlation engine is configured to determine a correlation between the plurality of mouse clicks and recorded screen to extract a second list of words.

Further, the system comprises a process analysis module configured to identify a plurality of processes accessing files for editing/modification in a computing environment using a process analysis module. The process analysis module is configured to identify at least one process from the plurality of processes as a ransomware using the process analysis module when a word corresponding to the process is absent in both the first list of words and the second list of words. The process analysis module is configured to identify a process accessing a file for replication using the process analysis module. The process is identified by a process name. The process analysis module is configured to check the process 'name' and corresponding file 'name' using the process analysis module with the first list of words and the second list of words. The process analysis module is configured to identify the process as a ransomware or a data breach using the process analysis module when words corresponding to the process 'name' and file name are absent in the first list of words and the second list of words.

According to an embodiment herein, the system comprises graphical user interface (GUI) based operating systems such as Windows, LINUX, Solaris, and Mac OS.

According to an embodiment herein, the system includes an inbuilt camera for checking the presence of a user in the system. Thus, the system helps to detect remote login or network attacks.

According to, an embodiment herein, a method and system are provided for detecting all types of malware including Ransomware and Crypto locker that exploit privilege escalation to encrypt entire hard drive.

According to pan embodiment herein, a non-transitory computer readable medium is stored with computer-readable instructions that are executed on a computing device comprising a hardware processor and a memory to perform a method for detecting ransomware and data breach in a computing environment. The method comprises monitoring a plurality of key strokes and a plurality of mouse events performed on the computing device. The plurality of keystrokes is detected by a key logger, and the plurality of mouse events are detected by a mouse event logger. The plurality of mouse events comprises a plurality of mouse movements and a plurality of mouse clicks. A display screen of the computing device is recorded with a screen recorder on occurrence of each mouse event. A correlation between the plurality of key strokes and the plurality of mouse movements is determined using a first correlation engine to extract a first list of words, and the first list of words are words that are input using a keyboard. Further, a plurality of processes accessing files for editing/modification is identified by a process analysis module by monitoring low-level system calls initiated by an operating system of the computing device. Each process in the plurality of processes is compared with the first list of words and the second list of words. At least one user process is identified as a ransomware using the process analysis module when a word corresponding to the process is absent in the first list of words and the second list of words. The process identified as a ransomware automatically trying to open or access the file is terminated. Further, a process accessing a file for replication is identified by the process analysis module. The process 'name' and corresponding file 'name' is compared with the first list of words and the second list of words. The process is identified as an authentic process using the process analysis module when the process name or the file name is present in at least one of the first list of words and the second list of words. The process is identified as a ransomware or a data breach using the process analysis module when words corresponding to the process name and file name are absent in the first list of words and the second list of words. Thereafter, the process corresponding to the ransomware or the data breach is terminated.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein disclose a system and method for detecting a ransomware and preventing data breach. The system and method herein identifies whether a file access request is initiated and executed by a user or by a malware program. The embodiments herein disclose a system and a method for detecting a data breach by using the keystrokes, the Mouse events (movements and clicks) along with an OCR output extracted from a recorded background screen image. Further, the method includes differentiating user activity on a file from a ransomware/automated program initiated activity to prevent data breach. The embodiments herein disclose a method for determining automated programs by analyzing a plurality of words extracted using OCR from a background screen image.

According to an embodiment herein, a computer-implemented method is provided for detecting both ransomware and data breach. The method comprises computer-readable instructions stored on a non-transitory computer readable medium and executed on a computing device comprising hardware processor and a memory, for detecting ransomware and data breach. The method comprises monitoring a plurality of key strokes and a plurality of mouse events performed on the computing device. The plurality of keystrokes is detected by a key logger and the plurality of mouse events are detected by a mouse event logger. The plurality of mouse events comprises a plurality of mouse movements and a plurality of mouse clicks. A display screen of the computing device is recorded with a screen recorder, on an occurrence of each mouse click. A correlation between the plurality of key strokes and the plurality of mouse movements is determined to extract a first list of words using a correlation engine. The first list of words are words that are input using a keyboard. A correlation between the plurality of mouse clicks and the recorded display screen is determined using the correlation engine to extract a second list of words. The first and second correlation engine are configured to check whether the user or automated process have clicked on a file or initiated a process to start. The second correlation engine is configured to check both the first list of words and the second list of words to judge whether the newly initiated process is initiated by a user or a process based on both the first list of words and the second list of words. Further, a plurality of processes accessing files for editing/modification is identified by a process analysis module by monitoring low-level system calls initiated by an operating system of the computing device. Each process in the plurality of processes is compared with the first list of words and the second list of words. At least one process is identified as a ransomware using the process analysis module when a word corresponding to the process is absent in the first list of words and the second list of words. The process identified as a ransomware automatically trying to open or access the file is terminated. Further, a process accessing a file for replication is identified by the process analysis module. The process 'name' and corresponding file 'name' is compared with the first list of words and the second list of words. The process is identified as an authentic process using the process analysis module when the process name or the file name is present in at least one of the first list of words and the second list of words. The process is identified as a ransomware or a data breach using the process analysis module when words corresponding to the process name and file name are absent in the first list of words and the second list of words. Thereafter, the process corresponding to the ransomware or the data breach is terminated.

According to an embodiment herein, a computer system for detecting zero-day privilege escalation malware in a computing environment is provided. The system comprises a hardware processor coupled to a memory containing instructions configured for running a privilege escalation module for identifying a malware. The system comprises a key logger configured to detect keystrokes performed by a user. A mouse event logger is configured to detect a plurality of mouse events. The plurality of mouse events comprises a plurality of mouse movements and a plurality of mouse clicks. A screen recorder is configured to record a display screen of the computing device on occurrence of each mouse click. An OCR word extractor is configured to extract only a second list of words. A first correlation engine is configured to determine a correlation between the key strokes and the mouse movements to extract a first list of words, wherein the first list of words are typed using keyboard. A second correlation engine is configured to determine a correlation between the plurality of mouse clicks and recorded screen to extract a second list of words.

Further, the system comprises a process analysis module configured to identify a plurality of processes accessing files for editing/modification in a computing environment using a process analysis module. The process analysis module is configured to identify at least one, process from the plurality of processes as a ransomware using the process analysis modulo when a word corresponding to the process is absent in both the first list of words and the second list of words. The process analysis module is configured to identify a process accessing a file for replication using the process analysis module. The process is identified by a process name. The process analysis module is configured to check the process 'name' and corresponding file 'name' using the process analysis module with the first list of words and the second list of words. The process analysis module is configured to identify the process as a ransomware or a data breach using the process analysis module when words corresponding to the process 'name' and file name are absent in the first list of words and the second list of words.

According to an embodiment herein, the system comprises graphical user interface (GUI) based operating systems such as Windows, LINUX, Solaris, and Mac OS.

According to an embodiment herein, the system includes an inbuilt camera for checking the presence of a user in the system. Thus, the system helps to detect remote login or network attacks.

Further, embodiments herein discloses a method and system for detecting all types of malware including Ransomware and Crypto locker that exploit privilege escalation to encrypt entire hard drive.

According to an embodiment herein, a non-transitory computer readable medium is stored with computer-readable instructions that are executed on a computing device comprising a hardware processor and a memory to perform a method for detecting, ransomware and data breach in a computing environment. The method comprises monitoring a plurality of key strokes and a plurality of mouse events performed on the computing device. The plurality of keystrokes is detected by a key logger, and the plurality of mouse events are detected by a mouse event logger. The plurality of mouse events comprises a plurality of mouse movements and a plurality of mouse clicks. A display screen of the computing device is recorded with a screen recorder on occurrence of each mouse event. A correlation between the plurality of key strokes and the plurality of mouse movements is determined using a first correlation engine to extract a first list of words, and the first list of words are words that are input using a keyboard. Further, a plurality of processes accessing files for editing/modification is identified by a process analysis module by monitoring low-level system calls initiated by an operating system of the computing device. Each process in the plurality of processes is compared with the first list of words and the second list of words. At least one process is identified as a ransomware using the process analysis module when a word corresponding to the process is absent in the first list of words and the second list of words. The process identified as a ransomware automatically trying to open or access the file is terminated. Further, a process accessing a file for replication is identified by the process analysis module. The process 'name' and corresponding file 'name' is compared with the first list of words and the second list of words. The process is identified as an authentic process using the process analysis module when the process name or the file name is present in at least one of the first list of words and the second list of words. The process is identified as a ransomware or a data breach using the process analysis module when words corresponding to the process name and file name are absent in both the first list of words and the second list of words. Thereafter, the process corresponding to the ransomware or the data breach is terminated.

Figure 1:
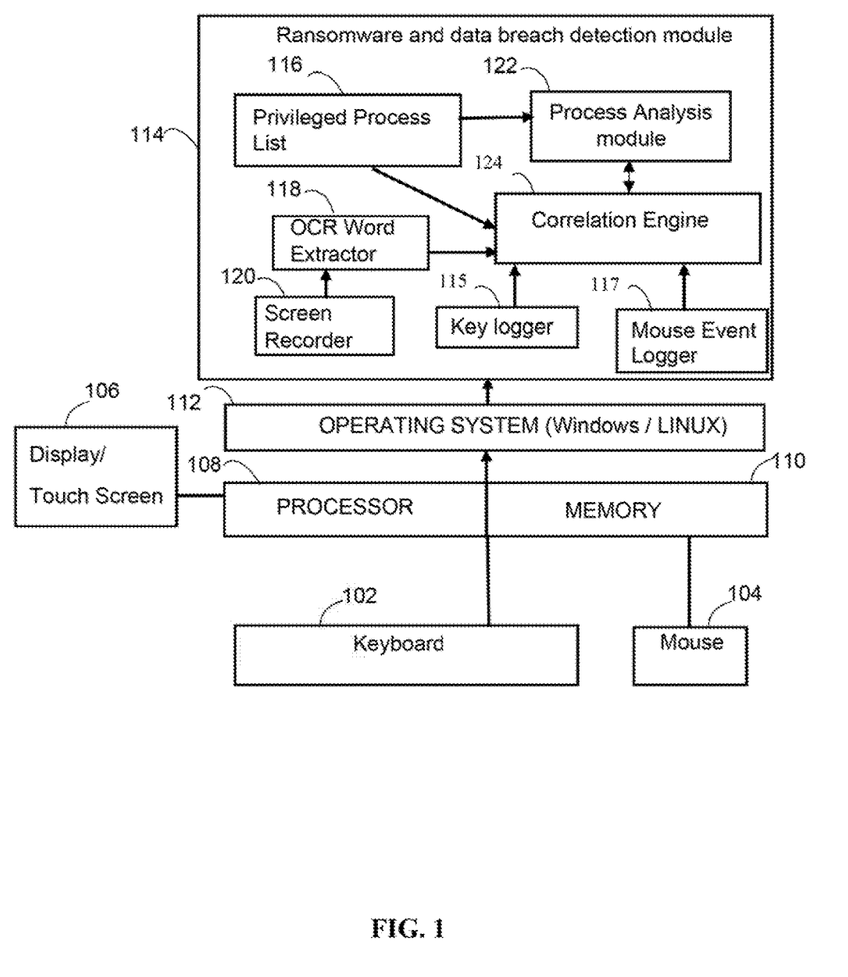
FIG. 1 illustrates a block diagram of a system for detecting a ransomware and data breach in a computing environment, according to an embodiment herein.

FIG. 1 illustrates a block diagram of a system for ransomware and data breach detection, according to an embodiment herein. The system includes keyboard 102, mouse 104, display 106, processor 108, memory 110 and the ransomware and data breach detection module 114 on a computing device. The computing device is any one of server device, client device, and personal computing device. According to an embodiment herein, the display 106 is a touchscreen display device. The ransomware and data breach detection module 114 is configured to run an application on the computing device to identify one off user initiated process, a ransomware and a data breach. A user initiates the normal Privilege escalation process. Further, the user initiates a process for a file access or file replication. The user activity is identified by analyzing a pattern found in the Key Strokes, Mouse Strokes and Extracted Text out of background screen using OCR. When a new process is initiated automatically without any pattern in Key Strokes, Mouse Strokes and background screen, then the process is identified as a ransomware or data breach. The system operates on a graphical user interface (GUI) based operating system 112 such as Windows, LINUX, Solaris, and Mac OS.

According to an embodiment herein, a hardware processor 108 is coupled to a memory 110 containing instructions configured for running the ransomware and data breach detection module 114 to detect a ransomware or data breach. The input device of the computing device is selected from a group consisting of the keyboard 102, the mouse 104 and the display or touch screen 106. According to an embodiment herein, the display unit is a monitor. The ransomware and data breach detection module executes an application that is configured to operate on the operating system 112. The ransomware and data breach detection module 114 further includes a key logger 115, a moose event logger 117, a screen recorder 120, an OCR word extractor 118, a correlation engine 124 and a process analysis module 122. The Key logger 115 is configured to record the user activity by analyzing key strokes during typing. The Mouse Event logger 117 is configured to record the mouse clicks and mouse movements along with the X and Y screen co-ordinates. The screen recorder 120 is configured to record a display screen image upon each mouse click. The OCR Word extractor 118 is configured to extract the words from the recorded background screen image by scanning the image and recognizing the written text. The Correlation Engine 124 further includes a first correlation engine and a second correlation engine. The first correlation engine is configured to determine correlation between key strokes and mouse movements to extract a first list of words. The second correlation engine configured to determine correlation between mouse clicks and recorded screen to extract a second list of words.

Further, the process analysis module 122 is configured to identify a plurality of processes accessing files for editing/modification by monitoring low-level system calls initiated by an operating system of the computing device. The plurality of processes is stored in the privileged process list 116. The process analysis module 122 compares each process in the plurality of processes with the first list of words and the second list of words. The process analysis module 122 identifies at least one process as a ransomware when a word corresponding to the process is absent in the first list of words and the second list of words. The analysis module 122 terminates the process that is identified as a ransomware that is automatically trying to open or access the file. Further, the process analysis module 122 identifies a process accessing a file for replication. The process analysis module 122 compares the process 'name' and corresponding file 'name' with the first list of words and the second list of words. The process analysis module 122 identifies the process as an authentic process when the process name or the file name is present in at least one of the first list of words and the second list of words. Further, the process analysis module 122 identifies the process as one of a ransomware car a data breach when words corresponding to the process name and file name are absent in the first list of words and the second list of words. Thereafter, the process corresponding to the ransomware or the data breach is terminated.

According to an embodiment herein, the ransomware and data breach detection module is configured to terminate and remove the process identified as ransomware or data breach from the system. Further, a report is generated and the executables are uploaded to various antivirus databases. Furthermore, the system updates the hash value to total virus website and other host and network security products. The system is configured to correlate the text extracted from background screen and the URLs visited from the system or the browser.

According to an embodiment herein, the system for ransomware and data breach detection has inbuilt cameras for checking the presence of user in the system. Thereby, the system helps to detect a remote login or network attacks.

According to an embodiment herein, the system for ransomware and data breach detection includes monitoring and correlating system calls or API calls along with keystrokes, mouse events and OCR output from recorded screen shots images for making it robust. The system is configured to correlate the text extracted from background screen and the URLs visited from the system or the browser.

Figure 2:
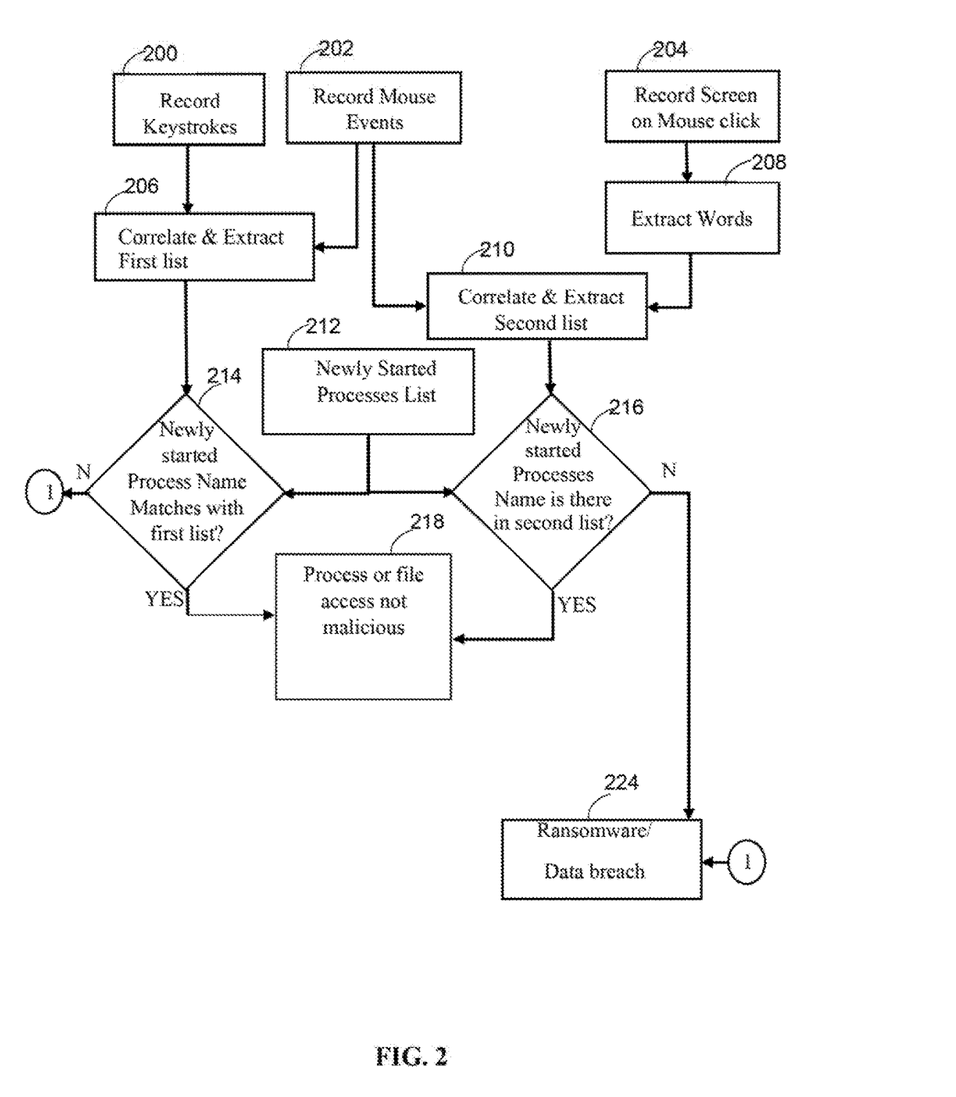
FIG. 2 illustrates a flowchart explaining a method for detecting a ransomware and data breach in a computing environment, according to an embodiment herein.

FIG. 2 illustrates a flowchart explaining a method of ransomware and data breach detection, according to an embodiment herein. The embodiments herein discloses a computer implemented method comprising computer-readable instructions stored on a non-transitory computer readable medium and executed on a computing device comprising hardware processor and a memory, for detecting ransomware and data breach in a computing environment. The embodiments herein identifies whether a file access request is initiated and executed by a user or by a malware program. The embodiments herein disclose a system and a method for detecting a data breach by using the keystrokes, the Mouse events (movements and clicks) along with an OCR output extracted from a recorded background screen image.

The method includes monitoring a plurality of key strokes and a plurality of mouse events performed on the computing device. At step 200, a key logger detects the plurality of keystrokes. At step 202, a mouse event logger detects the plurality of mouse events. The plurality of mouse events comprises a plurality of mouse movements and a plurality of mouse clicks along the X and Y screen co-ordinates. At step 204, a display screen of the computing device is recorded on occurrence of each mouse event with a screen recorder. At step 206, a correlation between the plurality of key strokes and the plurality of mouse movements is determined to extract a first list of words using a first correlation engine, and wherein the first list of words are typed using a keyboard. At step 208, the words are extracted from recorded OCR screens by an OCR screen recorder. At step 210, a correlation between the plurality of mouse clicks and the recorded display screen is determined with the second correlation engine to extract a second list of words. At step 212, a newly initiated process list including a plurality of processes accessing files for editing/modification is identified by a process analysis module by monitoring low-level system calls initiated by an operating system of the computing device. At step 214, the process analysis module checks whether the newly initiated privilege process is present in a list of processes that correspond to the first list of words. If 'yes' then the process is identified as a genuine process initiated by the user. At step 216, the process analysis module checks whether the process for replicating a file and corresponding file name is present in a list of processes corresponding to the second list of words. If 'yes' then the process is identified as a genuine process initiated by the user.

At least one process is identified as a ransomware using the process analysis module when a word corresponding to the process is absent in the first list of words and the second list of words. The process identified as a ransomware automatically trying to open or access the file is terminated. Further, the process is identified as a ransomware or a data breach using the process analysis module when words corresponding to the process name and file name are absent in the first list of words and the second list of words. Thereafter, the process corresponding to the ransomware or the data breach is terminated.

According to an embodiment herein, identifying a process for accessing a file for replication or copying using the process analysis module, includes identifying the process by a process 'name'. Further, the process 'name' and corresponding file 'name' is checked using the process analysis module with the first list of words and the second list of words. The process is identified as a ransomware or a data breach using the process analysis module when words corresponding to the process 'name' and file name are absent in both the first list of words and the second list of words.

According to an embodiment herein, the process analysis module checks for the presence of user control commands in a plurality of new initiated process that corresponds to the processes in the first list or the second list. The presence of user control commands identities and confirms that the newly initiated process is a user-initiated process for execution in privilege mode. In another condition, the newly initiated process is identified as a user initiated process when the selection of 'Yes' coordinates are identified in the User Account control screen. The process analysis module identifies a newly initiated process as a zero day privilege escalation malware using the process analysis module when the newly initiated privilege process is absent in a list of processes corresponding to the first list of words. Further, a newly initiated process is identified as a zero day privilege escalation malware using the process analysis module when the newly initiated privilege process is not specified in a list of processes corresponding to the second list of words. In another condition, at least one of a newly initiated process from the plurality of newly initiated process is detected as a zero day privilege escalation malware using the process analysis module when the user control commands are absent.

Figure 3:
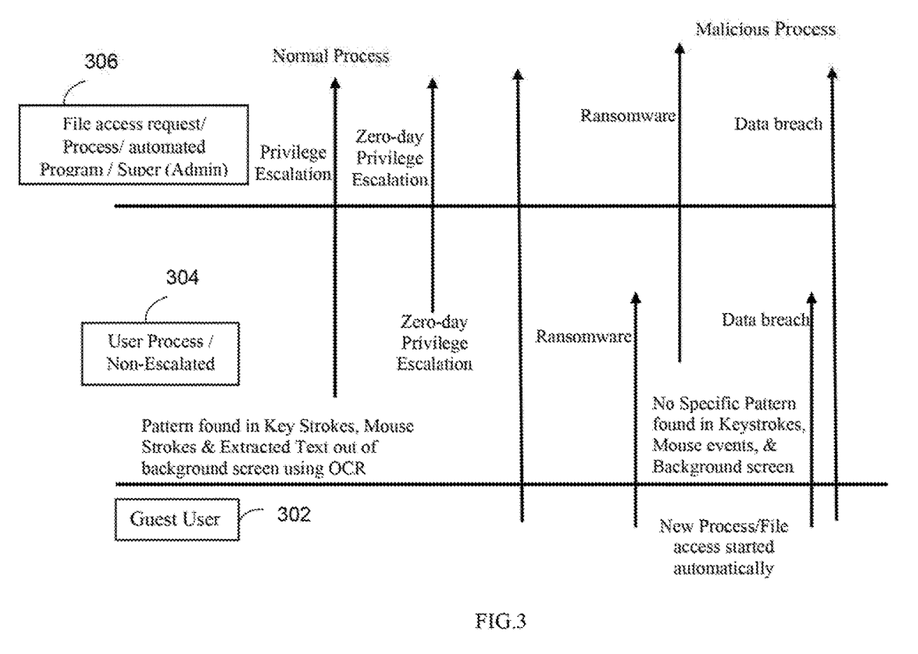
FIG. 3 illustrates a flowchart indicating the process sequences executed in the method of ransomware detection and data breach detection, according to an embodiment herein.

FIG. 3 illustrates a flowchart indicating the process sequences executed in the method of ransomware detection and data breach detection, according to an embodiment herein. The method involves identifying whether a process corresponding to file access or file replication is initiated and executed by a user or by a malware program. The method involves detecting and analyzing the keystrokes. Mouse events (movements and clicks) along with OCR output extracted from recorded background screen image for checking whether one of the guest user 302 and a user process 304 has initiated the process. The method further includes extracting words using OCR from background screen image for understanding process names and privilege of execution.

According to an embodiment herein, the new process is labelled as to ransomware or data breach when the process name is not included in the word list. On identifying a malicious process, a ransomware detection module is designed to inform the system administrator that a ransomware or data breach program is detected. Further, the ransomware detection module is designed to stop and remove the newly detected process from the system. Further, a report is generated and the executables are uploaded to various antivirus databases. Furthermore, the system updates the hash value to virus total website and other host and network security products.

Further, embodiments herein discloses a method of detecting all types of malware including Ransomware and Crypto locker that exploit privilege escalation to encrypt entire hard drive. The method operates on Graphical User Interface based operating systems including but not limited to windows, LINUX, Solaris, and Mac operating system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A computer implemented method comprising computer-readable instructions stored on a non-transitory computer readable medium and executed on a computing device comprising hardware processor and a memory, for detecting ransomware and data breach in a computing environment, the method comprises:
   monitoring a plurality of key strokes and a plurality of mouse events performed on the computing device, and wherein the plurality of keystrokes is detected by a key logger, and wherein the plurality of mouse events are detected by a mouse event logger, and wherein the plurality of mouse events comprises a plurality of mouse movements and a plurality of mouse clicks;
   recording a display screen of the computing device on occurrence of each mouse click with a screen recorder;
   determining a correlation between the plurality of key strokes and the plurality of mouse movements to extract a first list of words using a first correlation engine, wherein the first list of words are input using a keyword;
   determining a correlation between the plurality of mouse clicks and the recorded display screen using a second correlation engine to extract a second list of words;
   identifying a plurality of processes for accessing files for opening, editing/modification in a computing or file environment using a process analysis module;
   identifying at least one process from the plurality of processes as a ransomware using the process analysis module when a word corresponding to the process is absent in both the first list of words and the second list of words;
   identifying a process for accessing a file for replication or copying using the process analysis module, wherein the process is identified by a process name;
   checking the process "name" and corresponding file "name" using the process analysis module with the first list of words and second list of words; and
   identifying the process as a ransomware or a data breach using the process analysis module when words corresponding to the process "name" and file name are absent in both the first list of words and the second list of words;
   wherein the step of detecting a plurality of processes for accessing files for opening, editing/modification further comprises monitoring low-level system calls initiated by an operating system of the computing device.

2. The method as claimed in claim 1, wherein the step of identifying at least one process from the plurality of processes as a ransomware further comprises comparing each process from the plurality of processes with the first list of words and the second list of words.

3. The method as claimed in claim 1 further comprises detecting malware comprising Ransomware and Crypto locker.

4. The method as claimed in claim 1, wherein the method is operated with Graphical User Interface based operating systems and wherein the graphical user based operating systems comprises windows, LINUX, Solaris, and Mac operating systems.

5. The method as claimed in claim 1, wherein the process identified as a ransomware or the data breach is terminated from the computing environment or file environment.

6. A computer system for detecting ransomware and data breach in a computing environment, the system comprising:
   a hardware processor coupled to a memory containing instructions configured for running a ransomware and data breach detection module to detect ransomware and detect data breach;
   a key logger configured to detect keystrokes performed by a user;
   a mouse event logger configured to detect mouse events, wherein the plurality of mouse events comprises a plurality of mouse movements and a plurality of mouse clicks;
   a screen recorder configured to record a display screen of the computing device on occurrence of each mouse click;
   an OCR word extractor configured to identify words from the recorded display screen;
   a first correlation engine configured to determine a correlation between the plurality of key strokes and the plurality of mouse movements to extract a first list of words;
   a second correlation engine configured to determine a correlation between the plurality of mouse clicks and the recorded display screen to extract a second list of words; and
   a process analysis module;
   wherein the process analysis module is configured to identify a plurality of processes for accessing files for opening, editing/modification in a computing or file environment using a process analysis module, and wherein the process analysis module is configured to identify at least one process from the plurality or processes as a ransomware using the process analysis module when a word corresponding to the process is absent in both the first list of words and the second list of words, and wherein the process analysis module is configured to identify a process for accessing a file for replication or copying using the process analysis module, wherein the process is identified by a process name, and wherein the process module is configured to check the process "name" and corresponding file "name" using the process analysis module with the first with the first list of words and the second list of words; and wherein the process analysis module is configured to identify the process as a ransomware or a data breach using the process analysis module when words corresponding to the process "name" and file name are absent in the first list of words and the second list of words, and wherein the process analysis module is further configured to monitor low-level system calls initiated by an operating system of the computing device during the identification of a plurality of processes for accessing files for opening, editing/modification.

7. The system as claimed in claim 6, wherein the process analysis module is further configured to terminate and remove a process that is identified as a ransomware or a data breach.

8. A non-transitory computer readable medium stored with computer-readable instructions that are executed on a computing device comprising a hardware processor and a memory to perform a method for detecting zero privilege escalation in a computing environment, the method comprising steps of:

monitoring a plurality of key strokes and a plurality of mouse events performed on the computing device, and wherein the plurality of keywords is detected by a key logger, and wherein the plurality of mouse events are detected by a mouse event logger, and wherein the plurality of mouse events comprises a plurality of mouse movements and a plurality of mouse clicks;

recording a display screen of the computing device on occurrence of each mouse event with a screen recorder;

determining a correlation between the plurality of key strokes and the plurality of mouse movements to extract a first list of words using a first correlation engine, wherein the first list of words are input using a keyboard;

determining a correlation between the plurality of mouse clicks and the recorded display screen using a second correlation engine to extract a second list of words;

identifying a plurality of processes for accessing files for opening editing/modification in a computing or file environment using a process analysis module;

identifying at least one process from the plurality of processes as a ransomware using the process analysis module when a word corresponding to the process is absent in both the first list of words and the second list of words;

identifying a process accessing a file for replication or copying using the process analysis module, wherein the process is identifying by a process name;

checking the process "name" and corresponding file "name" using the process analysis module with the first list of words and the second list of words; and identifying the process as a ransomware or a data breach using the process analysis module when words corresponding to the process "name" and file name are absent in the first list of words and the second list of words;

wherein the step of identifying a plurality of processes for accessing files for opening, editing/modification using the process analysis module further comprises monitoring low-level system calls initiated by an operating system of the computing device.

* * * * *